April 21, 1970

C. M. WALSH 3,508,072

CONTROL APPARATUS

Filed Oct. 20, 1965

2 Sheets-Sheet 1

INVENTOR.
CYRAL M. WALSH

BY Bruce C Lutz

ATTORNEY

April 21, 1970 C. M. WALSH 3,508,072
CONTROL APPARATUS
Filed Oct. 20, 1965
2 Sheets-Sheet 2

INVENTOR.
CYRAL M. WALSH
BY Bruce C Lutz
ATTORNEY 3,508,072
CONTROL APPARATUS
Cyral M. Walsh, Sepulveda, Calif., assignor to Honeywell Inc., Minneapolis, Minn., a corporation of Delaware
Filed Oct. 20, 1965, Ser. No. 498,845
Int. Cl. G06g 7/18
U.S. Cl. 307—229 8 Claims

ABSTRACT OF THE DISCLOSURE

An integration circuit, for integrating both alternating and direct voltage signals, utilizing positive and negative feedback paths. The positive feedback path contains a synchronous lag circuit in the alternating version, which lag circuit receives the input signals to reduce timing errors and helps achieve a high degree of accuracy. The rate of change in the output affects the ratio of negative feedback to positive feedback.

THE INVENTION

The present invention relates generally to electronic circuits and more particularly to integrators.

There are many types of integrators in the prior art but most integrators have not been capable of providing long time constants. In most instances it is necessary to have a long time constant in order to have a long period of linear operation so as to be usable as an integrator. In particular, these long time constants have not been obtainable from completely electronic circuits which are used as AC integrators. Also, while electromechanical circuits have been devised which use motors, etc., to perform AC integration, none have been as reliable, small and simple as the present invention. Operational amplifiers can be used for integrating direct voltages and achieve performances somewhat similar to the present invention but no such simple circuit has been found to perform AC integration.

The present invention utilizes a high gain amplifier with two feedback circuits, one of which provides positive feedback and the other of which provides negative feedback. In an AC version of the integrator, the positive feedback leg contains a shaping circuit such that the AC signal may be integrated. The rest of the circuitry involved is merely a resistance network in the negative feedback path and an AC amplifier. There is no demodulation or modulation required as is found in other circuits attempting to provide the same function. The input signal to the integrator is applied to the leg of the feedback circuit providing positive feedback and is summed therewith. As will be explained later, this method of applying an input signal to the circuit assures the identity of the dynamic characteristic of the input lag and the feedback high pass which is necessary for proper operation of the circuit.

Under static conditions where there is no input signal applied to the integrating circuit, the positive and negative feedback legs almost exactly balance each other such that the net input applied to the amplifier is proportional to the inverse of the rate of change of the amplifier output. Thus, a very small rate of change in the output is sufficient to maintain a comparatively large output level. When an input signal is applied, the positive feedback leg is unbalanced and the rate of change of the output signal changes until the unbalance is reduced to that level required to sustain the instantaneous output level, and this situation is maintained.

Various objects and advantages of the invention may be determined from a reading of the specification and appended claims in conjunction with the drawings in which:

Figure 1:
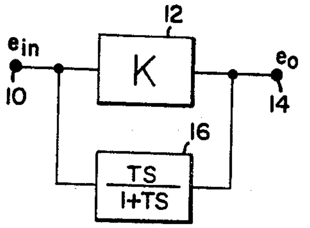
FIGURE 1 is a block diagram of a Laplacian transform equivalent of the amplifier and the combination of positive and negative feedback legs as one block for feedback around the amplifier.

In FIGURE 1 a voltage source $e_{in}$ is connected to a terminal 10 which is connected to an input of an inverting (not shown as such) amplifier 12. An output of amplier 12 is connected to an output terminal 14 which provides an output signal $e_0$. A feedback network which is labeled $$\frac{Ts}{1+Ts}$$

and is designated as 16 is connected between terminals 14 and 10 to provide feedback around amplifier 12.

Figure 2:
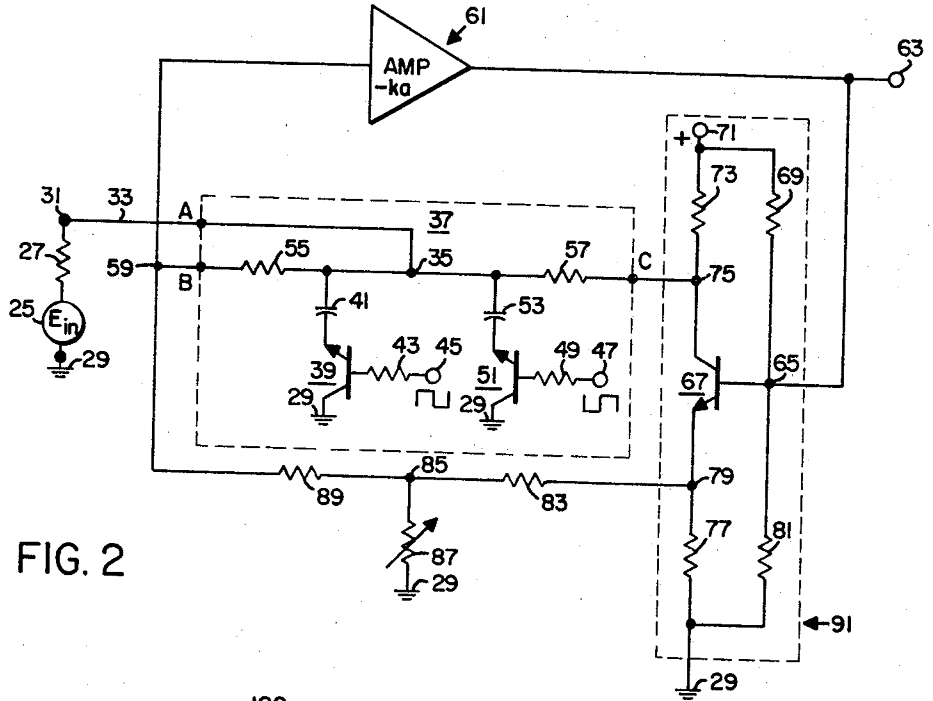
FIGURE 2 is a combination block and circuit diagram of the invention.

In FIGURE 2 a source of voltage 25 is connected in series with its source impedance 27 between ground or reference potential 29 and input terminal 31. Input terminal 31 is connected by means of a lead 33, through an input A on the periphery of a dashed line box 37, to a junction point 35 within the dashed line box 37. This circuit may be described as a synchronous lag circuit and is more fully described in a copending application to Adrian J. Moses, Ser. No. 377,007, which was filed in the Patent Office June 22, 1964, and assigned to the same assignee as the present invention.

A transistor 39 is connected in series with a capacitor 41 between ground 29 and junction point 35. A base of transistor 39 is connected through a resistor 43 to a terminal 45 to which a source of switching signal (not shown) is applied. A second source of switching signal is applied to a terminal 47. A resistor 49 is connected between terminal 47 and a base of a second switching transistor or valve 51. This second switching signal is opposite the phase of the signal applied to terminal 45 when transistors 39 and 51 are of the same polarity type. The collector-emitter connections of transistor 51 are utilized in connecting the transistor in series with a capacitor 53 between junction point 35 and ground 29. A second point on the periphery of the box is designated as B while a third point or terminal is designated as C. A resistor 55 is connected between junction point 35 and B and a resistor 57 is connected between junction point 35 and C. Point B is connected to a junction point 59 which is further connected to an input of a high gain amplifier generally designated as 61. An output of amplifier 61 is connected to an output terminal 63. Output terminal 63 is also connected to a junction point 65 which is further connected to a base of an NPN transistor generally designated as 67. A resistor 69 is connected between junction point 65 and a positive input terminal 71 for supplying power to transistor 67. A resistor 73 is connected between terminal 71 and a junction point 75 which is further connected to a collector of transistor 67 and to terminal C. A resistor 77 is connected between ground 29 and a junction point 79 which is further connected to an emitter of transistor 67. A resistor 81 is connected between junction point 65 and ground 29. A resistor 83 is connected between junction point 79 and a juction point 85. A variable resistance or impedance means 87 is connected between junction point 85 and ground 29. A resistance 89 is connected between junction point 85 and junction point 59. The transistor 67 along with the impedances 69, 73, 77, and 81 are contained with a dashed line box generally designated as 91. Box 91 is generally referred to as a phase splitter and need not always take the configuration shown. The leg or portion of the circuit designated as 37 is the positive feedback leg while the three resistors 83, 87, and 89 constitute the negative feedback leg or portion of the circuit.

Figure 3:
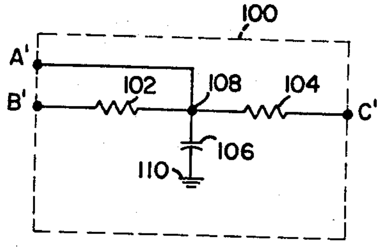
FIGURE 3 is a portion of the circuitry for the positive feedback leg which may be inserted in FIGURE 2 for use with integrating direct voltage or direct current signals rather than alternating signals.

FIGURE 3 contains circuitry which may be used in place of the positive feedback leg 37 of the circuit of FIGURE 2 when direct current or voltage signals are utilized and are to be integrated. Terminals A′, B′, and C′ are connected to the appropriate connections in FIGURE 2 in place of the circuit of box 37. The dashed line box in FIGURE 3 shall be designated as 100 while resistors 102 and 104 are utilized to perform the same function as resistors 55 and 57 in FIGURE 2. These two resistors are connected in series between points B′ and C′. A capacitor 106 is connected between a junction point 108 between the two resistors 102 and 104 and ground or reference potential 110 which may be the same as ground 29 in FIGURE 2.

Figure 4:
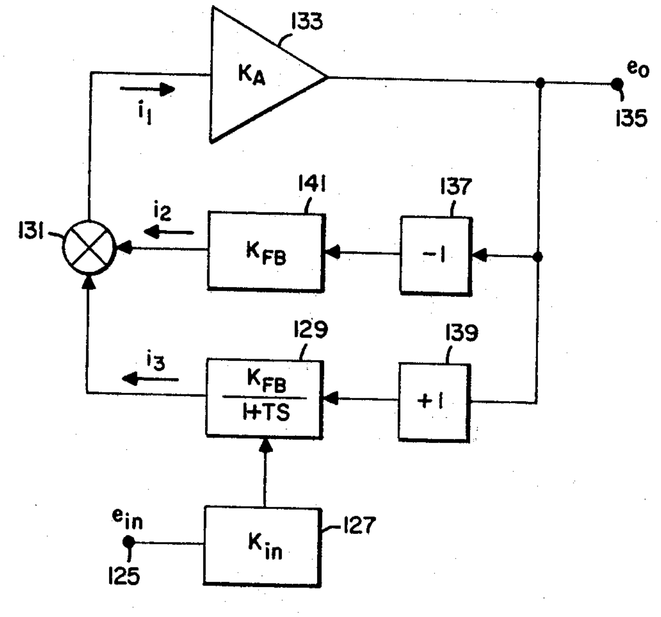
FIGURE 4 is a Laplacian transform equivalent of the combination of FIGURES 2 and 3.

FIGURE 4 shows a circuit which has an input terminal 125 which is labeled $e_{in}$ and provides an input to a box 127 which is labeled internally $K_{in}$. An output of box 127 provides a first input to a box 129 which is labeled internally in Laplacian transform notations $$\frac{K_{FB}}{1+Ts}$$

where $K_{FB}$ is the gain of 129, T is the RC time constant and $s$ is the Laplacian transform. An output of box 129 provides an input to a summing means 131. An output of summing means 131 provides an input to an amplifier 133 which is labeled internally $K_A$. An output of amplifier 133 is connected to an output terminal 135 which is labeled $e_o$. The output 135 is also connected to inputs of isolation means or boxes 137 and 139. Box 137 provides a phase inversion (polarity reversal in DC) and its output provides an input to a box 141 which is labeled internally $K_{FB}$. An output of $K_{FB}$ provides a second input to summing means 131. The box 139 provides a second input to box 129. Box 139 provides no phase inversion or polarity reversal.

Figure 5:
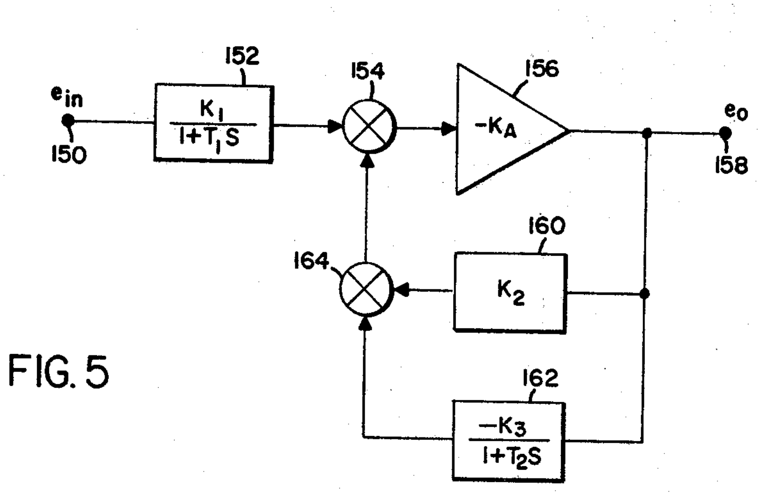
FIGURE 5 is also a Laplacian transform equivalent of the circuit of FIGURES 2 and 3.

FIGURE 5 contains an input 150 which is labeled $e_{in}$ and is connected to an input of a box 152 which is labeled internally $$\frac{K_1}{1+T_1s}$$

An output of box 152 provides an input to a summing means 154 which has an output connected to an input of an amplifier 156. Amplifier 156 is labeled internally $-K_A$. An output of amplifier 156 is connected to an output terminal 158 which is labeled $e_o$ and provides an output for the amplifier unit. Output terminal 158 also provides an input to a box 160 and an input to a box 162. Box 160 is labeled internally $K_2$ while box 162 is labeled internally $$\frac{-K_3}{1+T_2s}$$

The outputs of the two boxes 160 and 162 are connected to a summing means 164 which has an output connected to summing means 154 to provide an input thereto.

OPERATION

In explaining the operation of the present invention it will be necessary to refer to the mathematical language of those skilled in the art. This mathematical language is referred to as Laplacian transforms.

In describing the operation of the invention, it is believed that it will be simpler to explain the operation of the DC version first. Refer to FIGURE 4 as the transform equivalent of the combination of FIGURES 2 and 3, or the DC version of the circuit. In explaining the operation of FIGURE 4, $K_a$ will be defined in terms of volts per milliamp, $K_{FB}$ in milliamps per volt and $K_{in}$ in volts per volt. $K_{in}$ will be adjusted to a value necessary to be compatible with the rest of the circuitry and notation.

The instantaneous currents at point 131 of FIGURE 4 are as given in Equation 1.

$$(1)\qquad i_1=i_2+i_3$$

These currents can be defined as in Equations 2 through 4.

$$(2)\qquad i_3=e_{in}\left[\frac{K_{in}K_{FB}}{1+Ts}\right]+e_o\left[\frac{K_{FB}}{1+Ts}\right]$$

$$(3)\qquad i_2=e_oK_{FB}$$

$$(4)\qquad i_1=e_{in}\left[\overset{①}{\frac{K_{in}K_{FB}}{1+T_s}}\right]+e_o\left[\overset{②}{\frac{K_{FB}}{1+Ts}}\right]\overset{③}{-e_oK_{FB}}$$

In response to a step input ($e_{in}$) the following operations occur.

At any time in the transient period of operation, which is the period of interest, term ② is smaller than term ③ due to the lag inherent in box 129. Therefore, current $i_1$ is reduced from that value caused by the input circuit by the difference between terms ② and ③. Since the difference is dynamic, static gains of ② and ③ being the same, the difference will be proportional to the rate of change of the output ($E_o$). Equation 1 will be satisfied when $i_2$ is a large enough negative value to subtract that portion of $i_3$ which is in excess of that needed to sustain the instantaneous output level. During transient operation, the level of $i_3$ is changing due to the lag term presented in box 129. This will cause an increase in $i_1$ and consequently an increase in output voltage $e_o$, since $e_o$ equal $i_1K_a$, until $E_o$ drives $i_2$ to an instantaneous equilibrium value.

Since amplifier 133 requires an input in order to achieve an output, the input $i_1$ must increase proportionally as the output level increases. This will require that the difference between the terms ② and ③ become steadily less as the integrator output increases, thus establishing the limit to which the device will be a useful integrator. The component of $i_3$ due to the input is constant after the initial charge of the capacitor due to the step. This capacitor referred to would be capacitor 106 in FIGURE 3. The component of $i_3$ due to $E_o$ changes with both $E_o$ and the rate of change $E_o$. Since $i_2$ also changes with $E_o$, the difference between the contributions of the two feedback legs is determined by the rate of change of $e_o$ as operated upon by the feedback lag time constant of box 129. Since the lag time constant is constant, the variation in input current ($i_1$), regulated by the feedback contribution to $i_3$ must be done by variations in rate of change of $e_o$.

In view of the above, a large input would require a larger difference between ② and ③ at a given level to maintain equilibrium than would a small input. As is known to those skilled in the art, this is a basic characteristic of an integration function. The above explanation pertains equally well to the AC verison.

Referring now to the combination of FIGURES 2 and 3, it will be seen that amplifier 61 corresponds to amplifier 133 while the phase splitter 91 corresponds to the combination of boxes 137 and 139. Box 37 corresponds to the lag term 129 in FIGURE 4 and the box 141 corresponds to the circuit comprising the three resistors 83, 87, and 89. The input signal 25 in combination with resistor 27 corresponds to the input 125 and the box 127.

Reference will now be made to FIGURE 5 for an explanation partially in terms of Laplacian transforms of the operation of the invention. Boxes 160 and 162 will be considered independently for the present even though it will be shown that the two in combination are the equivalent of box 16 in FIGURE 1. The output divided by the input of these two boxes or in other words the output of summing means 164 over the voltage $e_o$ will provide the Equation 5 which has been operated on in Equations 6 and 7 to produce the result shown.

$$\text{(5)} \qquad \frac{\text{output}}{\text{input}}=K_3-\frac{K_3}{1+Ts}$$

$$\text{(6)} \qquad =\frac{K_2+K_2Ts-K_3}{1+Ts}$$

$$\text{(7)} \qquad =K_2\left[\frac{Ts}{1+Ts}\right] \text{ if } K_2=K_3$$

As will be realized, Equation 7 results from Equation 6 only if $K_2$ equals $K_3$. In the operation of the circuit, the two feedback networks as adjusted so that for practical purposes this is true.

The above type of mathematical analysis applies to the envelopes of AC signals in AC shaping networks such as shown in circuit 37 when the appropriate time constant computations are taken into account.

The loop transfer functions of the amplifier 156 in combination with the feedback circuits 160 and 162 take the form shown in the following Equations 8, 9, and 10.

$$\text{(8)} \qquad \frac{\text{output}}{\text{input}}=\frac{-K_a}{1-\frac{(K_aK_2T_2)s}{1+T_2s}}$$

$$\text{(9)} \qquad =\frac{-K_a(1T_2s)}{1+T_2s+K_aK_2T_2s}$$

$$\text{(10)} \qquad \frac{-K_a(1+T_2s)}{1+(K_aK_2T_2+T_2)s}$$

As many be determined, if $K_aK_2T_2>>T_2$ and further if $K_aK_2T_2>>1$, Equation 10 can be modified as shown in Equation 11.

$$\text{(11)} \qquad \frac{\text{output}}{\text{input}}=\frac{-K_a(1+T_2s)}{+K_aK_2T_2s}=-\frac{1+K_2s}{K_2T_2s}$$

While Equation 11 is not completely accurate due to the assumptions made, the equation is close enough for all practical purposes. As may be observed, there is still an unwanted term $1+T_2s$ in the numerator of Equation 11. This term is removed by the use of box 152 which in combination with the previously mentioned portions of FIGURE 5 provides the Laplacian transform equivalent shown in Equation 12.

$$\frac{e_o}{e_{in}}=\left[\frac{K_1}{1+T_{1s}}\right]-\left[\frac{-1+T_2s}{K_2T_2s}\right]=-\frac{K_1}{K_2T_2s} \text{ if } T_1=T_2$$

The asumption was made in the latter part of Equation 12 that $T_2$ equals $T_1$. In actual practice this would be hard to obtain in the configuration of FIGURE 5 and for this reason the input voltage is applied to an input of box 162 such as is shown in FIGURES 2 and 4. This guarantees that $T_1$ will be identically equal to $T_2$. Thus, a nearly perfect integrator is obtained if the above assumptions used in advancing from Equation 10 to Equation 11 are valid. Equation 12 is of the form $$\frac{e_o}{e_{in}}=\frac{1}{T's}, \text{ where } T'=\frac{K_2T_2}{K_1}$$

This is the Laplacian equivalent of an integration.

A further distinctive feature of the present invention is the inherent limiting feature of the AC shaping network 37. By choosing the proper hold off voltage at the base of the drive transistors 39 and 51, limiting of the peak to peak voltage across the capacitors can be achieved. If this limiting is applied to the positive feedback leg and the input, at levels above the desired limit, the integrator will revert to an amplifier with only negative feedback and so limit the integrator output.

Since the interaction of the various portions of the circuit for FIGURE 2 are very involved, an attempt at explaining a step by step operation of the circuit will not be made. However, the circuit shown in FIGURE 2 has been operated and found in one embodiment to provide a time constant of more than 2000 seconds, and it can be shown that the mathematics used to illustrate the DC version also apply accurately, although not rigorously to the operation of the AC integrator.

While specific designations have been given to the various resistors and capacitors for purposes of clarity it is evident that in many instances other impedances may be usable and that the specific embodiment shown is only one form of practicing the invention. Also, while the transistors have been designated as such, it is apparent that they can also be designated as valves, switching means, or amplifying means. As will be further realized, the gain of amplifier 61 must be of a large value for greatest accuracy and that the gain of the amplifier enters into the determination of the time constant of the circuit by determining the validity of the assumption made to obtain Equation 11.

Since the invention lies in the general type of circuitry shown in AC and DC versions in FIGURES 4 and 5, respectively, I do not intend to be limited by the specific embodiment shown in FIGURES 2 and 3 but only by the scope of the appended claims in which I claim:

1. The method of integrating a signal supplied to an amplifier comprising the steps of:
- supplying both positive and negative feedback around an operational amplifier;
- providing a first order delay of the positive feedback signals with respect to the negative feedback signals.

2. The method of claim 1 comprising the additional step of providing a first order delay of the signal to be integrated which is the same as provided the positive feedback signal.

3. Integration apparatus comprising, in combination:
- amplifying means including input and output means;
- negative feedback means having the general Laplacian transform of $K_1$;
- positive feedback means having the general Laplacian transform of $$\frac{K_2}{1+Ts}$$

- means connecting said feedback means for said output means to be said input means of said amplifying means; and
- means for supplying an input signal to be integrated to the amplifying means wherein the input signal is subjected to a delay comparable to that provided by said positive feedback means.

4. Apparatus as claimed in claim 3 wherein said input signal is supplied through said positive feedback means to said amplifying means.

5. Apparatus of the class described comprising, in combination:
- amplifier means including input and output means;
- phase splitter means, including first and second output means and input means said phase splitter means, including a transistor and providing first and second out of phase signals at said first and second output means thereof in response to any signals received at said input means thereof;
- means connecting said output means of said amplifier means to said input means of said phase splitter means for supplying feedback signals thereto;
- first feedback circuit means connected between said first output means of said phase splitter means and said input means of said amplifier means;
- second feedback circuit means connected between said second output means of said phase splitter means and said input means of said amplifier means for providing positive feedback signals thereto, said second feedback circuit means including two capacitive units alternately and synchronously switched to a reference potential for integrating alternating signals; and input means connected to said second feedback circuit means for supplying an input signal, to be integrated, thereto.

6. Apparatus of the class described comprising, in combination:

amplifier means including input and output means;

phase splitter means, including first and second output means and input means, for providing first and second out of phase signals at said first and second output means thereof in response to any signals received at said input means thereof;

means connecting said output means of said amplifier means to said input means of said phase splitter means for supplying feedback signals thereto;

first feedback circuit means connected between said first output means of said phase splitter means and said input means of said amplifier means;

second feedback circuit means connected between said second output means of said phase splitter means and said input means of said amplifier means, said second feedback circuit means including capacitive lag circuit means; and input means connected to said second feedback circuit means for supplying an input signal, to be integrated, thereto.

7. The invention defined in claim 6 wherein the input means has a given source impedance and the first feedback circuit means has a shunt impedance to a reference potential which is substantially the same impedance as said source impedance.

8. The invention claimed in claim 6 wherein the signal supplied by said phase splitting means to said second feedback circuit means constitutes a positive feedback signal.

References Cited

UNITED STATES PATENTS

| | | | |
|---|---|---|---|
| 3,129,326 | 4/1964 | Balaban | 328—127 |
| 3,221,186 | 11/1965 | Macdonald | 307—229 |
| 3,246,251 | 4/1966 | Sheppard | 330—28 |

JOHN S. HEYMAN, Primary Examiner

D. M. CARTER, Assistant Examiner

U.S. Cl. X.R.

307—293; 328—127